US012413896B2

(12) United States Patent
Jeong et al.

(10) Patent No.: US 12,413,896 B2
(45) Date of Patent: Sep. 9, 2025

(54) TWO-WAY SPEAKER

(71) Applicant: EM-TECH Co., Ltd., Gyeongsangnam-do (KR)

(72) Inventors: Chan Ho Jeong, Gyeongsangnam-do (KR); Young Seok Noh, Gyeongsangnam-do (KR); Byung Min Yu, Seoul (KR)

(73) Assignee: EM-TECH Co., Ltd, Gyeongsangnam-do (KR)

( * ) Notice: Subject to any disclaimer, the term of this patent is extended or adjusted under 35 U.S.C. 154(b) by 205 days.

(21) Appl. No.: 18/240,137

(22) Filed: Aug. 30, 2023

(65) Prior Publication Data

US 2024/0073586 A1 Feb. 29, 2024

(30) Foreign Application Priority Data

Aug. 31, 2022 (KR) ........................ 10-2022-0110061

(51) Int. Cl.
*H04R 1/24* (2006.01)
*H04R 9/02* (2006.01)

(52) U.S. Cl.
CPC ............... *H04R 1/24* (2013.01); *H04R 9/025* (2013.01); *H04R 2400/11* (2013.01)

(58) Field of Classification Search
CPC ...... H04R 1/24; H04R 9/025; H04R 2400/11; H04R 2209/022; H04R 9/047; H04R 9/06; H04R 19/02; H04R 2209/026; H04R 9/046; H04R 9/063; H04R 7/16; H04R 1/26
See application file for complete search history.

(56) References Cited

U.S. PATENT DOCUMENTS

| | | | | |
|---|---|---|---|---|
| 2022/0210532 A1* | 6/2022 | Han | ........................ | H04R 9/063 |
| 2023/0345169 A1* | 10/2023 | Yu | ........................... | H04R 9/046 |

FOREIGN PATENT DOCUMENTS

| | | | | | |
|---|---|---|---|---|---|
| KR | 20050096467 | A | | 10/2005 | |
| KR | 101177322 | B1 | * | 8/2012 | H04R 19/02 |
| KR | 101501898 | B1 | * | 3/2015 | H04R 1/24 |
| KR | 101760291 | B1 | * | 7/2017 | H04R 1/24 |
| KR | 102203376 | B1 | * | 1/2021 | H04R 1/26 |
| KR | 102252018 | B1 | * | 5/2021 | H04R 9/025 |
| KR | 102389509 | B1 | | 4/2022 | |
| KR | 20220092663 | A | | 7/2022 | |
| KR | 20220094344 | A | | 7/2022 | |
| KR | 102667294 | B1 | * | 5/2024 | H04R 1/24 |
| KR | 20240100727 | A | * | 7/2024 | H04R 7/16 |

* cited by examiner

*Primary Examiner* — Angelica M McKinney
(74) *Attorney, Agent, or Firm* — Murphy, Bilak & Homiller, PLLC

(57) ABSTRACT

A two-way speaker includes: a frame having a space for accommodating parts; a yoke partitioning the space of the frame vertically and having a lower surface and a side wall; a first speaker unit disposed below the yoke and having a magnet, a top plate, a voice coil, and a diaphragm; a protector disposed below the first speaker unit and protecting the diaphragm; a second speaker unit disposed above the yoke and having a magnetic circuit and a flexible-printed coil membrane (F-PCM) diaphragm having a coil pattern formed on a polymer film; and a sound emission yoke attached to an upper surface of the second speaker unit.

6 Claims, 13 Drawing Sheets

TWO-WAY SPEAKER

TECHNICAL FIELD

The present disclosure relates to a two-way speaker.

BACKGROUND

FIG. 1 is a diagram illustrating a two-way speaker according to the related art. In the two-way speaker according to the related art, a cover 10 is coupled to an upper side of a frame 11 formed with an open top and a yoke 12 is coupled to an upper side of the frame 11 inside the cover 10 to form a space portion in which a large speaker unit 30 is installed between a yoke bottom plate 12-1 and a bottom surface of the frame 11.

In the yoke 12, a yoke cylinder 12-2 is integrally formed on an outer periphery of the yoke bottom plate 12-1 formed to have a disk shape, a yoke flange 12-3 is integrally formed at an upper end of the yoke cylinder 12-2, and the yoke flange 12-3 protrudes slightly upwardly relative to an upper surface of the cover 10.

A sound emission hole 40 is formed in the upper surface of the cover 10 and the yoke flange 12-3 coupled as described above so that sound (consonants) generated by a large speaker unit 30, which will be described in detail below, is emitted (output) to the outside of a small speaker 20, which will be described in detail below, through the sound emission hole 40.

In the yoke 12, a first magnet 13 equipped with a first magnetic plate 15 is installed on (fixed to) an upper surface of the yoke bottom plate 12-1 so that a first air gap 26 is formed between an outer periphery of the first magnet 13 and the yoke cylinder 12-2, and the small speaker unit 20 was installed on the yoke flange 12-3 on an upper side of the first magnet 13.

In the related art, since the yoke 12 is generally machined through a press process, the yoke flange 12-3 is formed by bending the outer peripheral portion of the yoke cylinder 12-2. Accordingly, a bent portion between the yoke cylinder 12-2 and the yoke flange 12-3 consequently includes a round-shaped section. FIG. 2 is a diagram illustrating magnetic field flow around the round section of the yoke of the 2-way speaker according to the related art. As can be seen in the drawing, the round section formed by the bending is vulnerable to magnetic flux leakage. In addition, a small diaphragm 21 included in the small speaker unit 20 is fixed to the upper surface of the yoke flange 12-3 by a small diaphragm holder 22 having a small outer periphery. Here, there is a disadvantage in that a separate jig should be used to match the concentricity of the small diaphragm 21 and the voice coil 25.

In order to solve this problem, the present applicant has proposed a two-way receiver having a yoke assembly having a magnetic field condensation structure in Korea Patent No. 10-2252018.

FIGS. 3 and 4 are diagrams illustrating the two-way speaker disclosed in Korean Patent No. 10-2252018. The two-way speaker according to the related art includes a yoke assembly including a yoke 10*a* and a first ceramic plate 12*a* attached to an upper surface of the yoke 10*a*.

A first speaker unit including a first permanent magnet 31, a first top plate 32, a first voice coil 41, and a first diaphragm 51 is installed above the yoke assembly. In addition, a second speaker unit including a second permanent magnet 33, a second top plate 34, a second voice coil 42, and a second diaphragm 52 is installed below the yoke assembly.

However, speakers having a dynamic structure generally have the advantage in low frequencies because they may use large power due to good magnetic field efficiency, but are disadvantageous in high frequencies the weight of a vibrating system that increases due to the relatively heavy voice coils 41 and 42 attached to the diaphragms 51 and 52. Although a speaker specialized for high-frequency sound, while adopting the dynamic structure, may be designed but has shortcomings that a response speed is slow because power generated by the magnetic field is indirectly transferred to the diaphragms 51 and 52 through the voice coils 41 and 42.

Therefore, it is required to develop a two-way speaker including a tweeter speaker which is advantageous for high-frequency sound and has a fast response speed.

SUMMARY

An aspect of the present disclosure provides a two-way speaker employing a flexible-printed coil membrane (F-PCM) structure as a tweeter speaker.

According to an embodiment of the present disclosure, a two-way speaker includes: a frame having a space for accommodating parts; a yoke partitioning the space of the frame vertically and having a lower surface and a side wall; a first speaker unit disposed below the yoke and having a magnet, a top plate, a voice coil, and a diaphragm; a protector disposed below the first speaker unit and protecting the diaphragm; a second speaker unit disposed above the yoke and having a magnetic circuit and a flexible-printed coil membrane (F-PCM) diaphragm having a coil pattern formed on a polymer film; and a sound emission yoke attached to an upper surface of the second speaker unit.

As another example of the embodiment, the frame may have a groove portion, serving as a duct for guiding sound from the first speaker unit toward the sound emission yoke, on an inner circumferential surface of the side wall of the frame.

As another example of the embodiment, the sound emission yoke may include a first sound emission hole for emitting sound transferred from the first speaker unit and a second sound emission hole for emitting sound generated by the second speaker unit.

As another example of the embodiment, the frame may have an atmospheric pressure equalization hole on a side thereof to reduce a difference in atmospheric pressure between upper and lower sides of the diaphragm.

As another example of the embodiment, the magnetic circuit of the second speaker unit may include a lower magnet including a lower center magnet attached to a center of an upper surface of the yoke and a lower side magnet having a ring shape and disposed to be spaced apart from the lower center magnet and an upper magnet including an upper center magnet attached to a center of a lower surface of the sound emission yoke and an upper side magnet having a ring shape and disposed to be spaced apart from the upper center magnet, and the F-PCM diaphragm may be located between the lower magnet and the upper magnet.

As another example of the embodiment, the magnet of the first speaker unit may have a magnetization direction the same as magnetization directions of the lower side magnet and the upper center magnet of the second speaker unit and have a magnetization direction opposite to magnetization directions of the lower center magnet and the upper side magnet.

Since the two-way speaker according to the embodiment employs a speaker including a flexible-printed coil membrane (F-PCM) diaphragm as a tweeter speaker handling high-frequency range of sound, power based on a magnetic field may be directly transferred to the F-PCM that serves as both a diaphragm and a coil and reduces the weight of a vibrating system compared with a dynamic structure, which is advantageous for high-frequency sound reproduction.

In addition, the two-way speaker provided by the embodiment requires additional parts and processes because speakers having different structures are separately manufactured and then combined using additional injection-molded products, but in the embodiment, both the first speaker unit and the second speaker unit are installed on the yoke to form a single unit, thereby simplifying the manufacturing process.

DETAILED DESCRIPTION

Hereinafter, embodiments are described in more detail with reference to the drawings.

Figure 1:
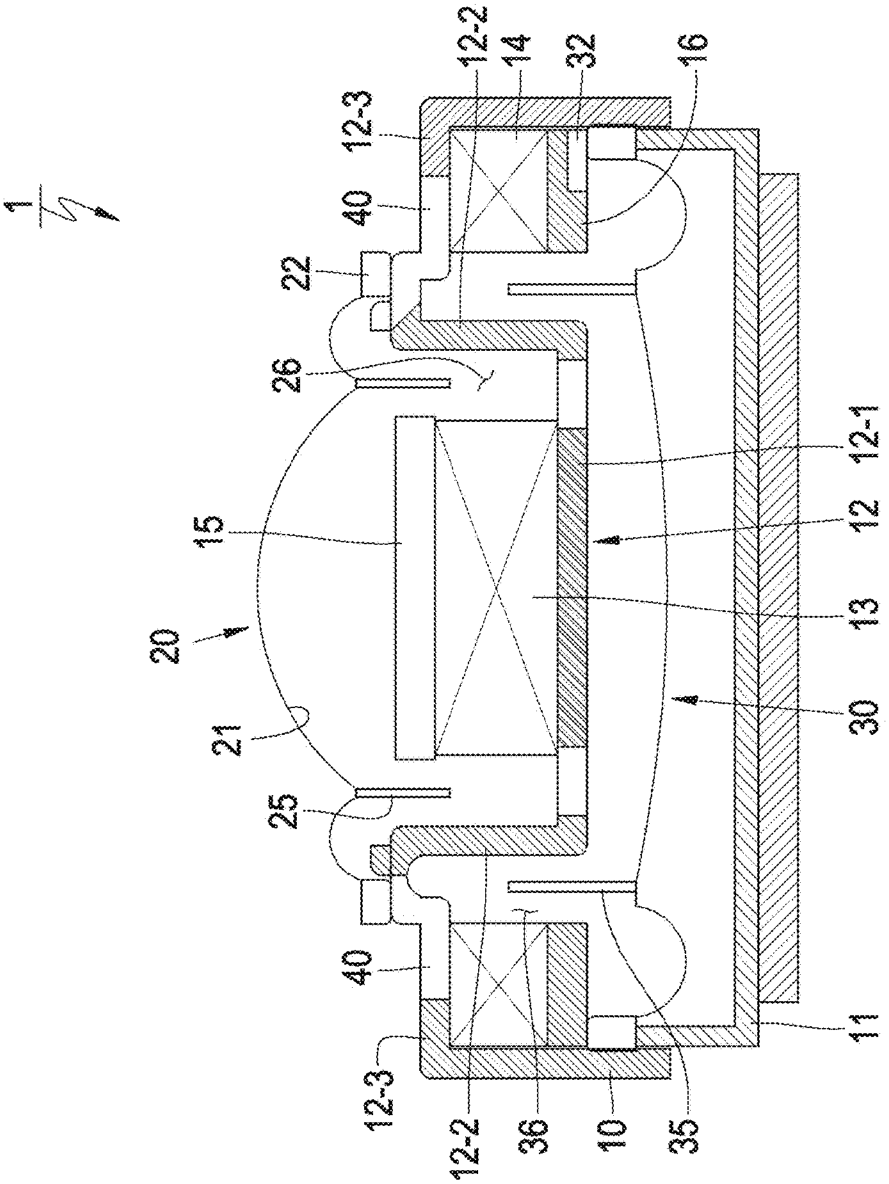
FIG. 1 is a view illustrating a two-way speaker according to a related art.
Figure 2:
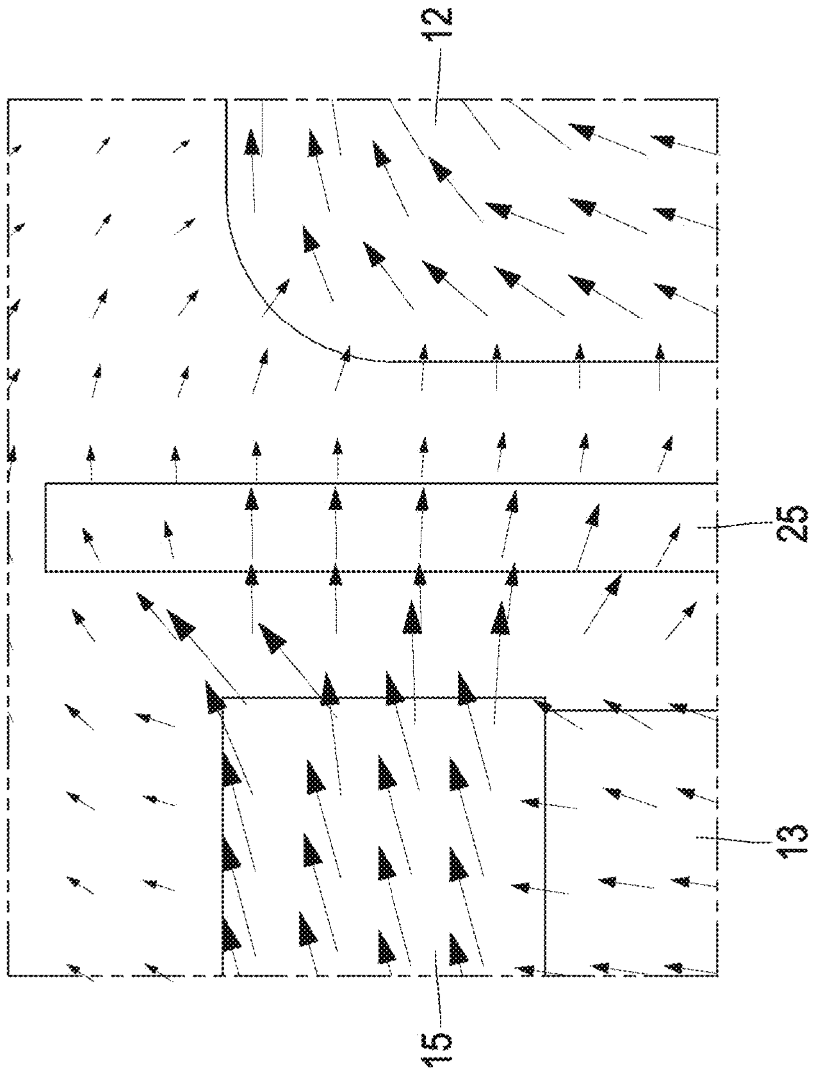
FIG. 2 is a diagram illustrating a magnetic field flow around a round section of a yoke of the 2-way speaker according to the related art.
Figure 3:
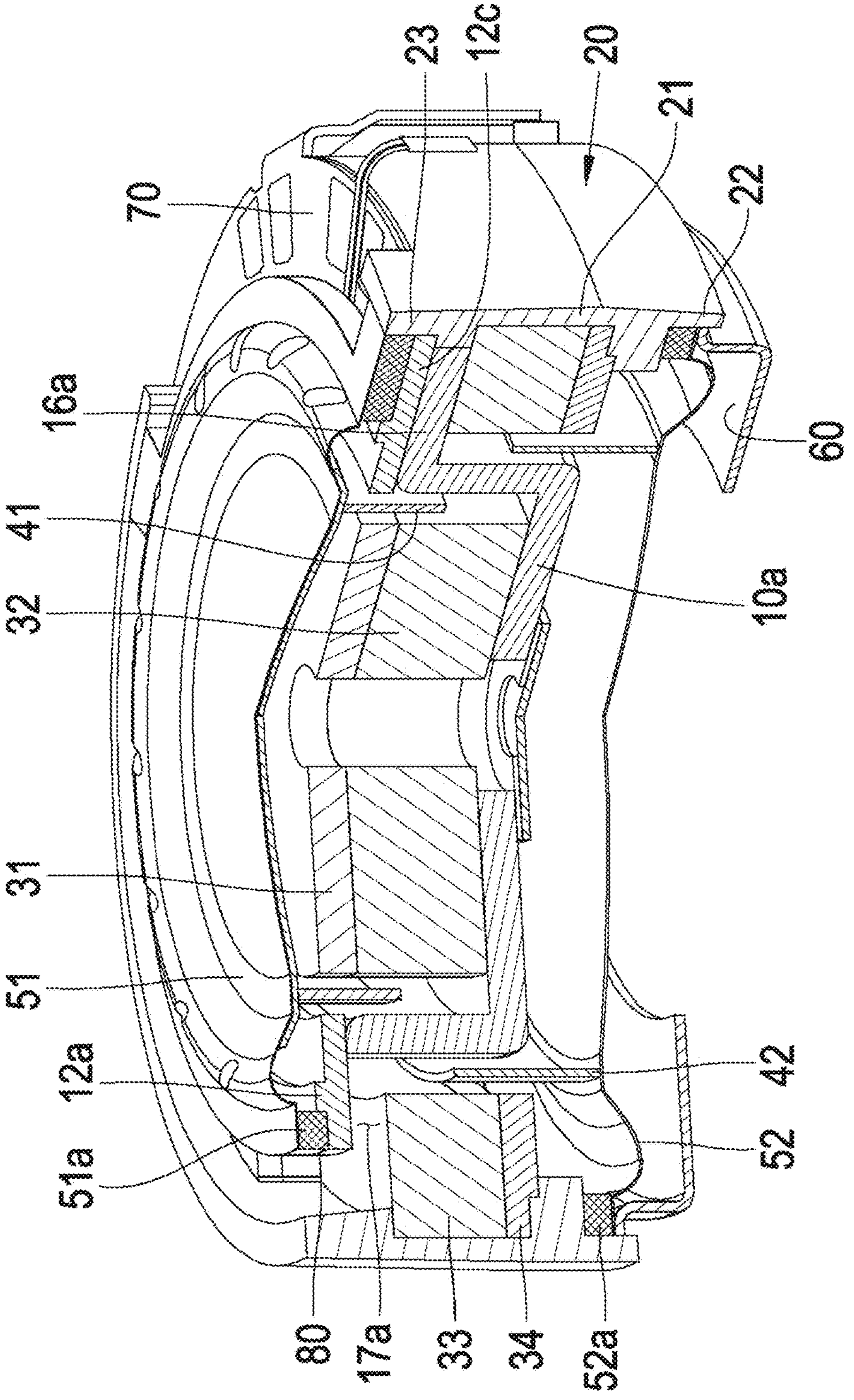
FIGS. 3 and 4 are diagrams illustrating a two-way speaker disclosed in another related art.
Figure 4:
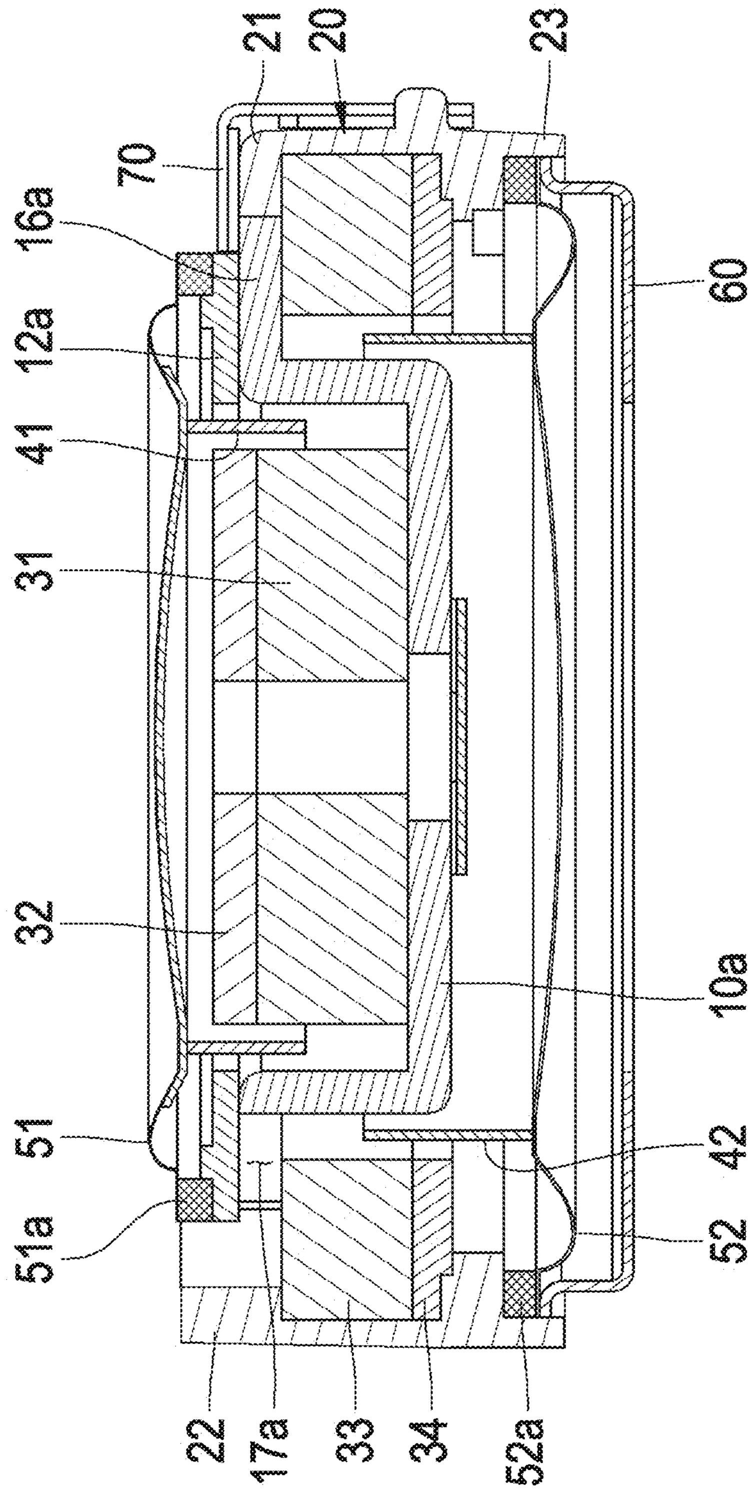
Figure 5:
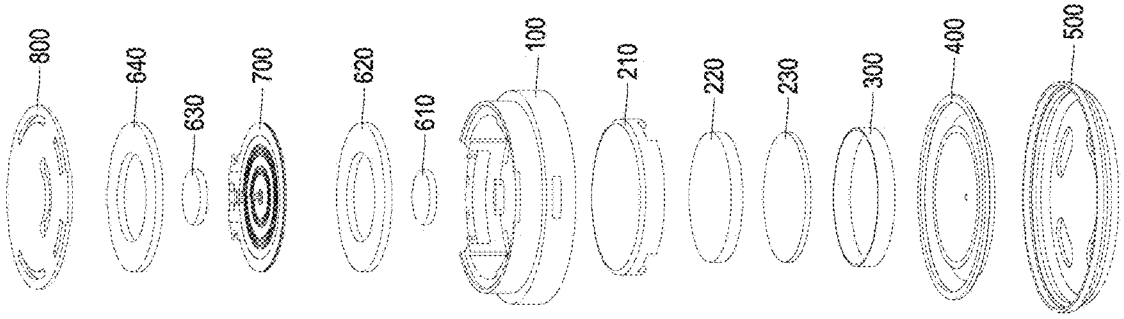
FIG. 5 is an exploded view of a two-way speaker according to an embodiment.
Figure 6:
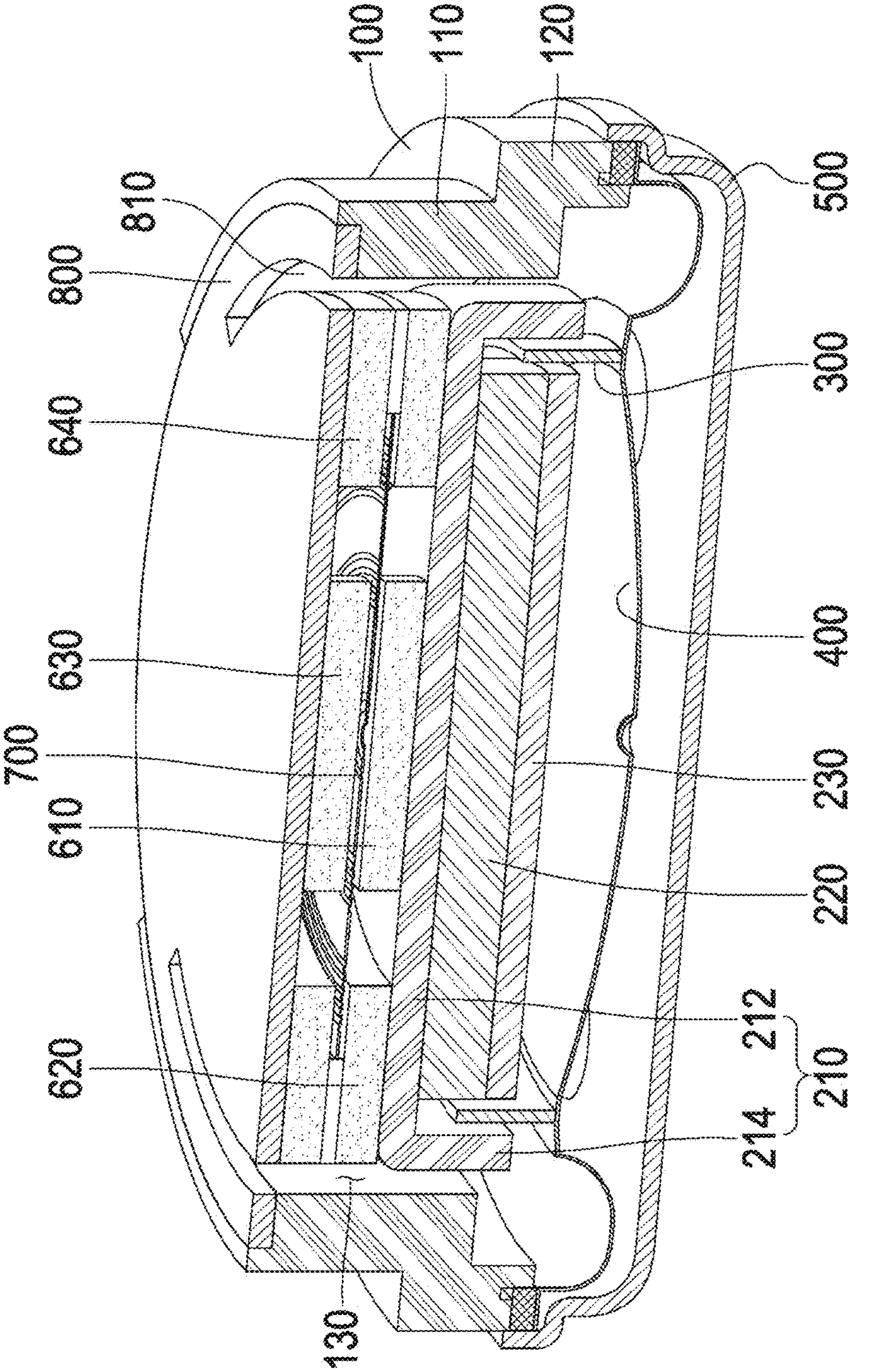
FIG. 6 is a cross-sectional view of a two-way speaker according to an embodiment.

FIG. 5 is an exploded view of a two-way speaker according to an embodiment, and FIG. 6 is a cross-sectional view of a two-way speaker according to an embodiment.

A two-way speaker according to an embodiment includes a first speaker unit employing a dynamic speaker and a second speaker unit employing a flexible-printed coil membrane (F-PCM) vibrating system. The first speaker unit and the second speaker unit are installed in one frame 100 and share a yoke 210.

The first speaker unit employs a dynamic speaker structure of the related art, and a magnetic circuit including the yoke 210, a magnet 220, and a top plate 230 is installed in the frame 100. The yoke 210 has a circular top surface 212 and a cylindrical side wall 214, and the side wall 214 is coupled to an inner circumferential surface of the side wall 110 of the frame 100.

A magnetic gap is formed between the sidewall 214 of the yoke 210 and the magnet 220, and an upper end of the voice coil 300 is located in the magnetic gap. The upper end of the voice coil 300 is attached to a diaphragm 400. The frame 100 is provided with a seating end 120 on which an outer periphery of the diaphragm 400 is seated. A voice coil 300 is attached to the diaphragm 400, and when an electric signal is applied to the voice coil 300, the voice coil vibrates by mutual electromagnetic force with a magnetic circuit. Here, the diaphragm 400 to which the voice coil 300 is attached also vibrates and generates sound. In an embodiment, the first speaker unit may be one-magnet type speaker unit in which a magnetic gap is formed between the sidewall 214 of the yoke 210 and the magnet 220, or a two-magnet type, a three-magnet type, or a five-magnet type dynamic speaker may be employed as needed.

At the lowermost side, a protector 500 is coupled to the frame 100 to surround the diaphragm 400 of the first speaker unit. In detail, the protector 500 surrounds the outer periphery of the frame 100 and is attached to an upper surface of the diaphragm 400 to protect the first speaker unit.

Meanwhile, an F-PCM type second speaker unit is installed above the yoke 210. The second speaker unit includes a magnetic circuit and an F-PCM 700.

The second speaker unit includes the yoke 210, magnets 610, 620, 630, and 640, and a sound emission yoke 800, as a magnetic circuit.

The magnets 610, 620, 630, and 640 include lower magnets 610 and 620 including a lower center magnet 610 attached to the center of an upper surface of the yoke 210 and a lower side magnet 620 having a ring shape and disposed to be spaced apart from the lower center magnet 610 and upper magnets 630 and 640 including an upper center magnet 630 attached to the center of a lower surface of the sound emission yoke 800 and an upper side magnet 640 having a ring shape and disposed to be spaced apart from the upper center magnet 630. The F-PCM 700 is disposed between the lower magnets 610 and 620 and the upper magnets 630 and 640.

Figure 7:
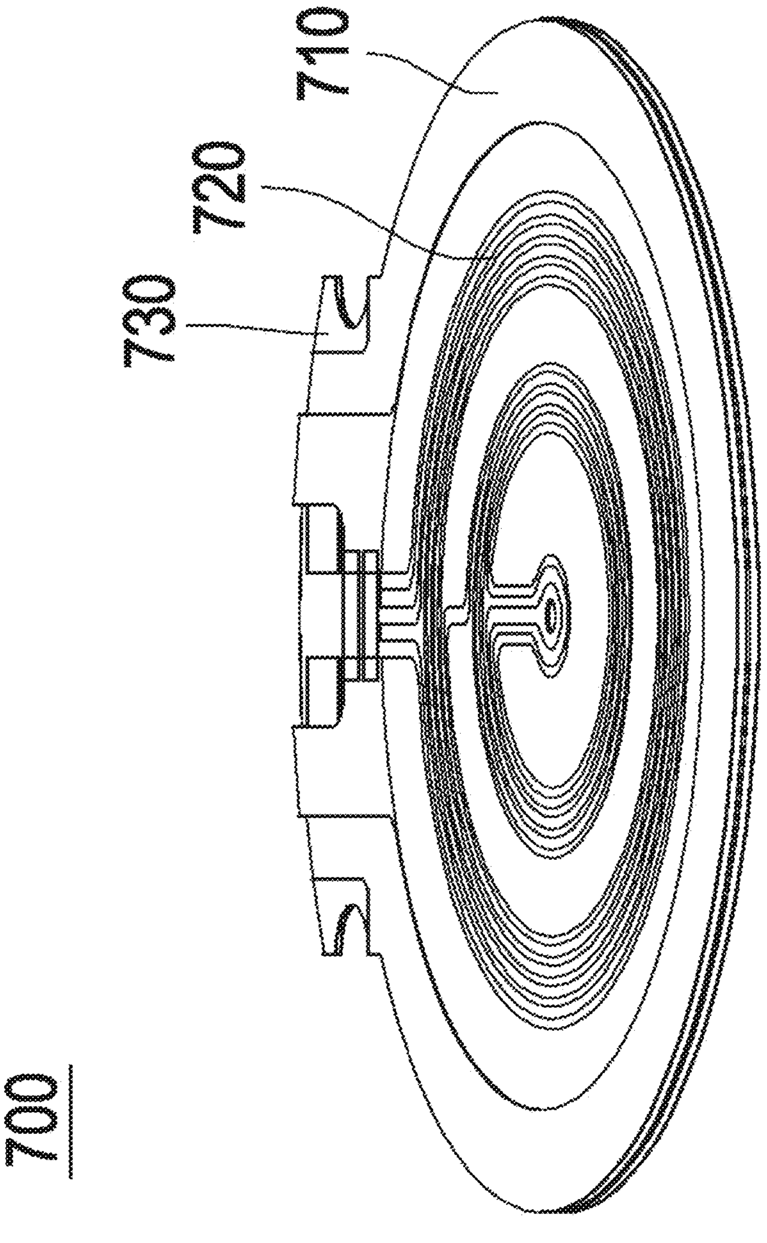
FIG. 7 is a diagram illustrating a flexible-printed coil membrane (F-PCM) diaphragm provided in a two-way speaker according to an embodiment.

FIG. 7 is a diagram illustrating an F-PCM diaphragm included in a two-way speaker according to an embodiment.

The F-PCM 700 has a conductive pattern 720 formed on a polymer film 710, and serves as both a diaphragm and a voice coil in a dynamic speaker. The F-PCM 700 is very thin compared to the total height of the voice coil, so it is advantageous for miniaturization, and since the F-PCB 700 is light in weight to be advantageous for high-frequency sound reproduction, the F-PCM 700 may be advantageously used as a tweeter speaker.

Meanwhile, instead of having a separate terminal, the F-PCM 700 may be elongated to form a terminal portion 730, and the terminal portion 730 may be connected to an external power source or an external circuit or may be connected to a control circuit of a two-way speaker. As described above, the sound emission yoke 800 is attached to the upper side of the lower magnets 610 and 620. In this case, the sound emission yoke 800 may have a sound emission structure so that not only sound generated by the second speaker unit but also sound generated by the first speaker unit may be emitted.

Figure 8:
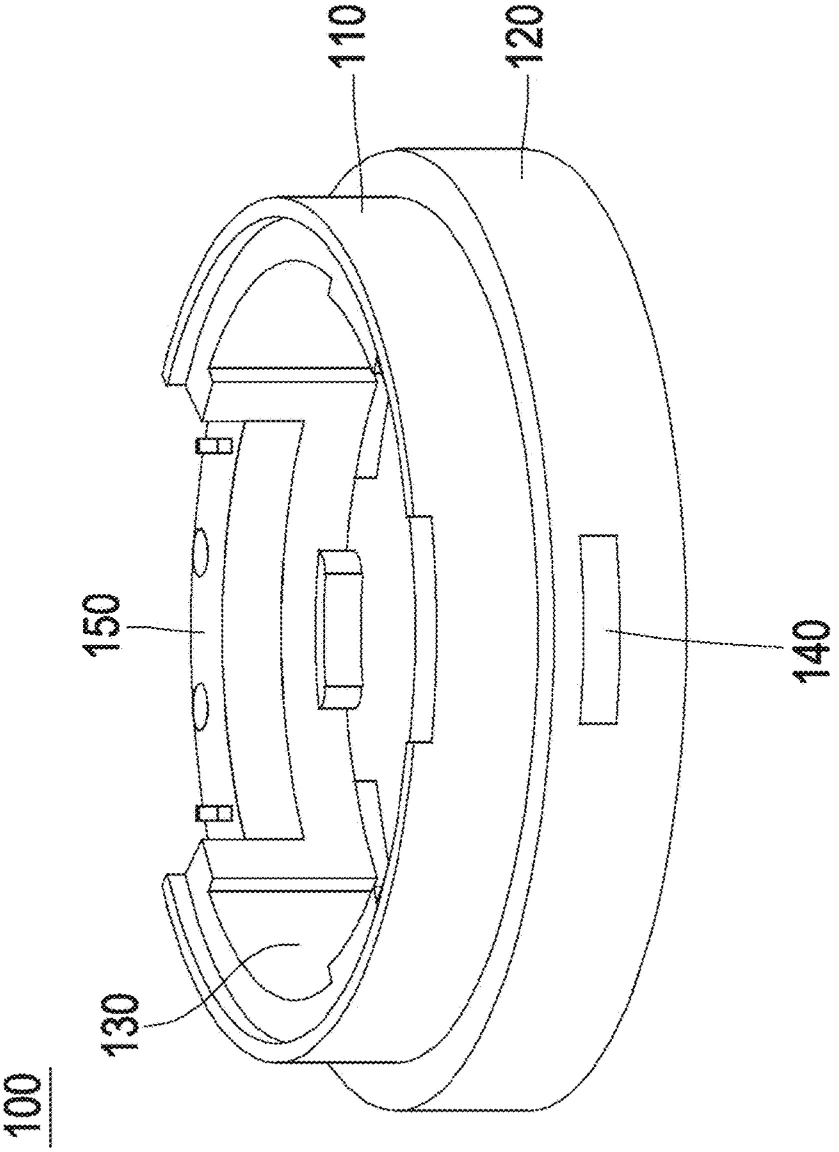
FIG. 8 is a diagram illustrating a frame provided in a two-way speaker according to an embodiment.
Figure 9:
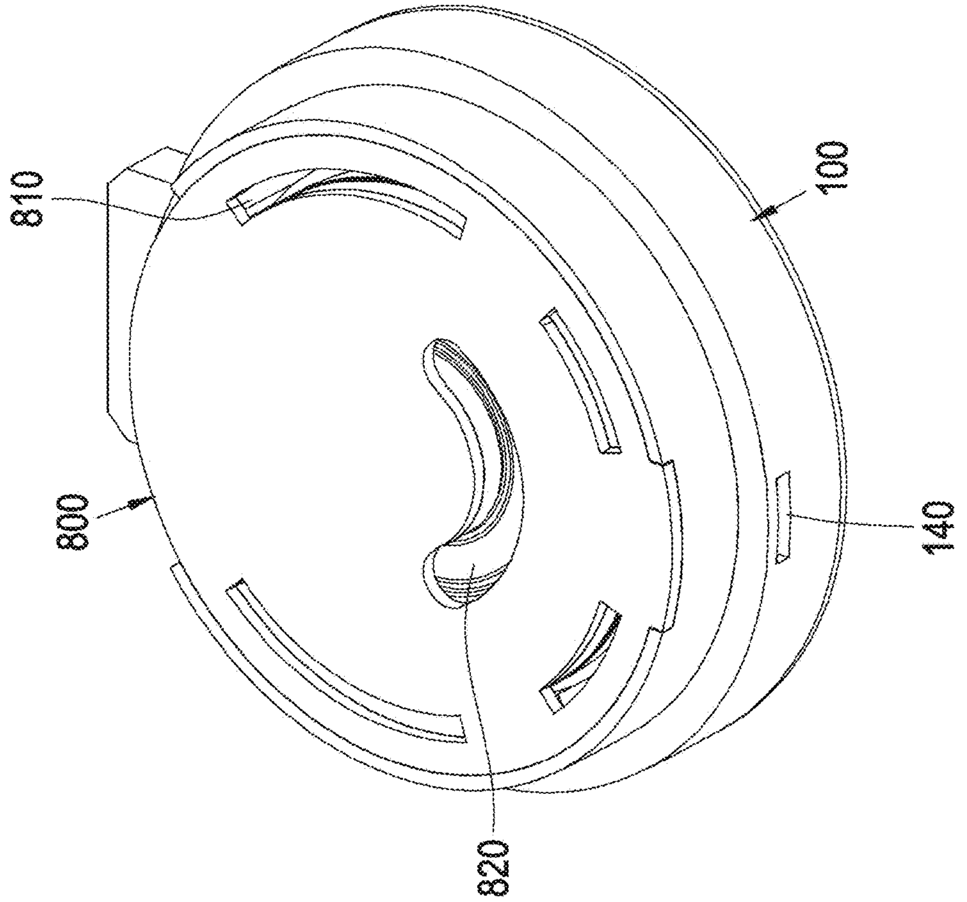
FIG. 9 is a perspective view of a two-way speaker according to an embodiment.
Figure 10:
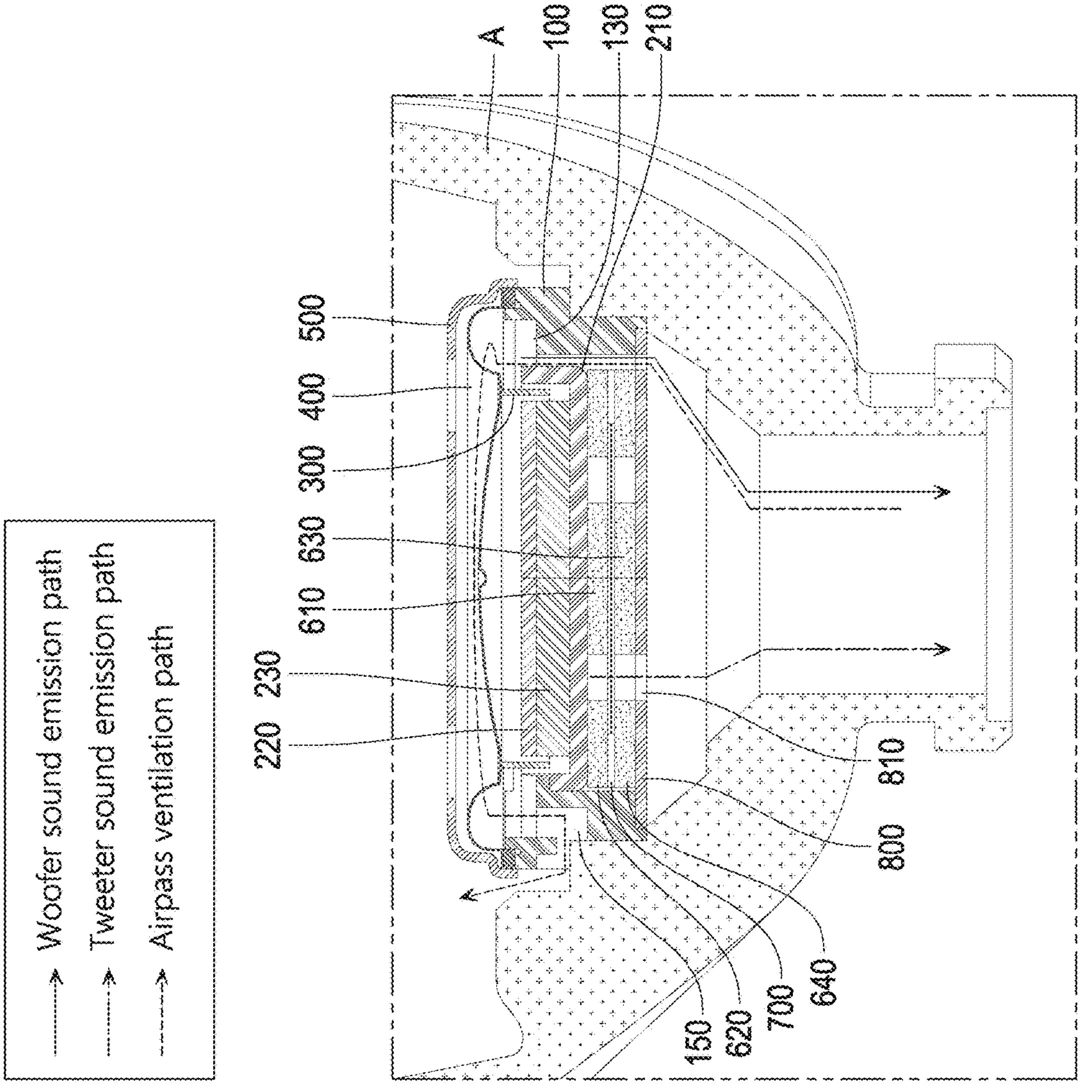
FIG. 10 is a view illustrating a two-way speaker installed in an ear set according to an embodiment.

FIG. 8 is a view illustrating a frame provided in a two-way speaker according to an embodiment, FIG. 9 is a perspective view of a two-way speaker according to an embodiment, and FIG. 10 is a view illustrating a two-way speaker installed in an ear set according to an embodiment.

The frame 100 includes a side wall 110 having an inner circumferential surface coupled to an outer surface of the yoke 210 and outer surfaces of the lower side magnet 620 and the upper side magnet 640. In this case, one or more groove portions 130 serving as a duct for guiding sound reproduced by the first speaker unit to the sound emission yoke 800 are formed on the inner circumferential surface of the side wall 110. The groove portion 130 is connected to a first sound emission hole 810 formed in the sound emission yoke 800, so that sound reproduced by the first speaker unit is emitted to the first sound emission hole 810.

In addition, sound reproduced by the second speaker unit is emitted through a second sound emission hole 820 formed in a position corresponding to a gap between the upper center magnet 630 and the upper side magnet 640. That is, the sound reproduced by the first speaker unit and the sound reproduced by the second speaker unit are emitted in the same direction.

Meanwhile, when the two-way speaker is installed in an ear set, a diaphragm 400 of the first speaker unit, which is a dynamic speaker, vibrates, and a difference in atmospheric pressure between an ear canal and the outside may cause deafness or pain in the ear. In order to prevent this, the frame 100 includes an atmospheric pressure equalization hole 140 penetrating through the side wall 110. The atmospheric pressure equalization hole 140 is formed in a position that may communicate with an upper space of the diaphragm 400 of the first speaker unit. At this time, a mesh or a filter may be installed in the atmospheric pressure equalization hole 140 to adjust air permeability of air flowing in and out through the atmospheric pressure equalization hole 140.

FIG. 10 is a view illustrating a two-way speaker installed in an earphone according to an embodiment, in which the red arrow indicates a sound emission path of sound generated by the first speaker unit, the blue arrow indicates a sound emission path of sound generated by the second speaker unit, and the black arrow indicates an air flow path for atmospheric pressure equalization.

Figure 11:
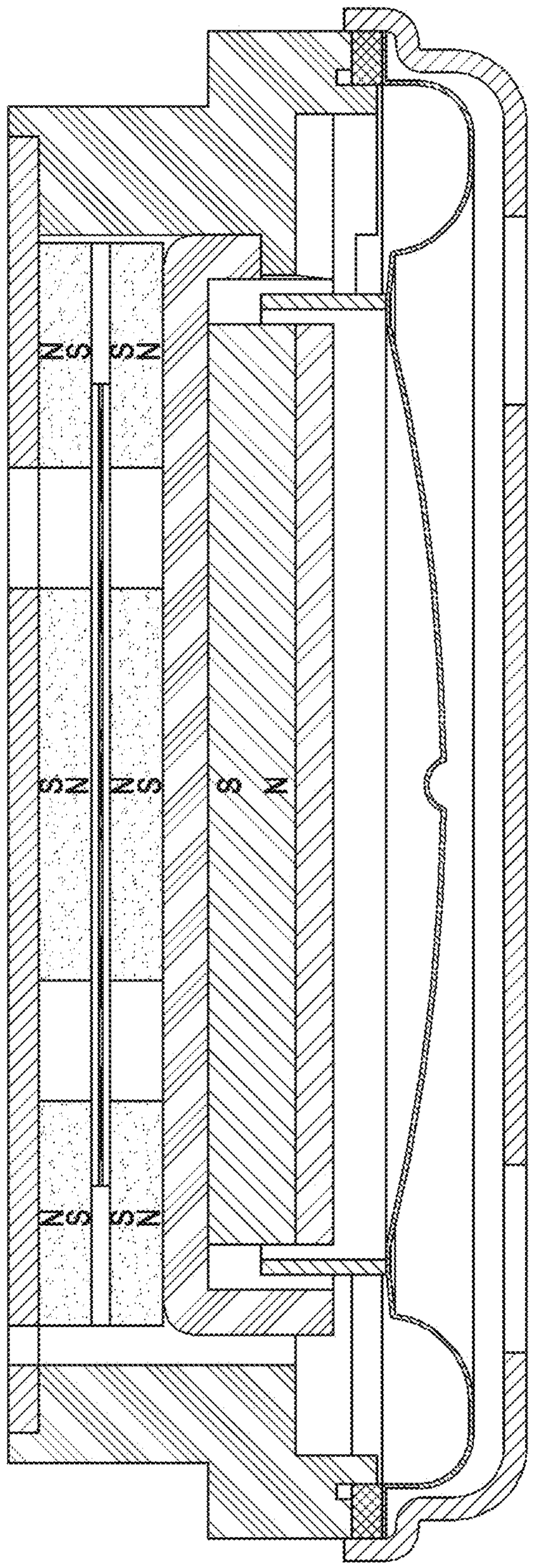
FIG. 11 is a diagram illustrating a magnet polarity arrangement of a two-way speaker according to an embodiment.
Figure 12:
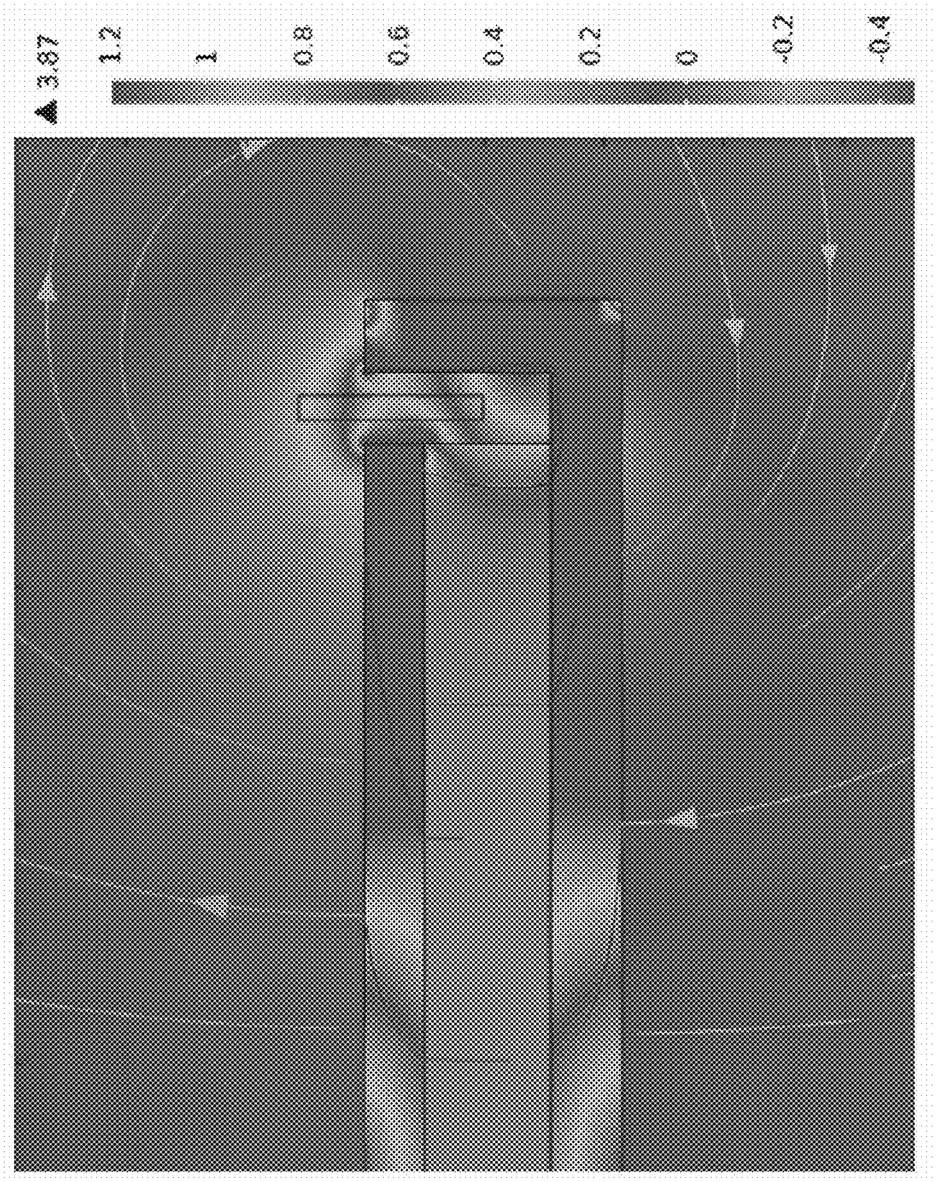
FIG. 12 is a diagram illustrating magnetic flux density of a dynamic speaker provided in a two-way speaker according to an embodiment.
Figure 13:
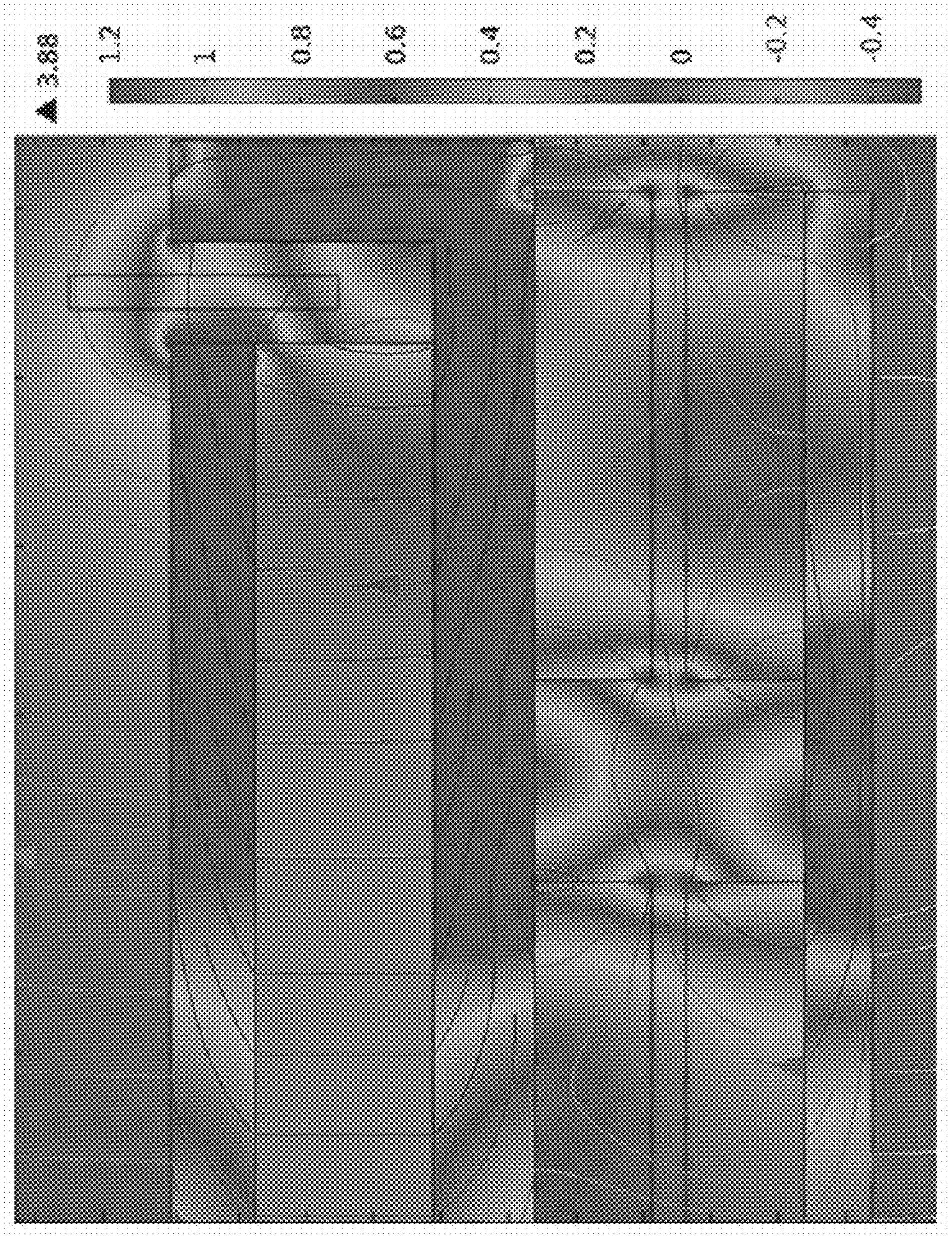
FIG. 13 is a diagram illustrating magnetic flux density when a dynamic speaker provided in a two-way speaker and an F-PCM speaker are installed together according to an embodiment.

FIG. 11 is a diagram illustrating a magnet polarity arrangement of a two-way speaker according to an embodiment, FIG. 12 is a diagram illustrating a magnetic flux density of a dynamic speaker provided in a two-way speaker according to an embodiment, and FIG. 13 is a diagram illustrating magnetic flux density when a dynamic speaker provided in a two-way speaker and an F-PCM speaker are installed together according to an embodiment.

As described above, each speaker unit of the two-way speaker shares the yoke 210. Accordingly, the number of required parts may be reduced and a product assembly process may be simplified. In addition, the efficiency of a magnetic field shared by the two speakers may be increased by controlling a magnetization direction of the magnet 220 of the first speaker unit and the magnets 610, 620, 630, and 640 of the second speaker unit. For example, as shown in FIG. 11, a magnetic flux density may be improved by controlling a magnetization direction of the magnet 220 of the first speaker unit to be the same as those of the lower side magnet 620 and the upper center magnet 630 of the second speaker unit and to be the opposite to those of the lower center magnet 610 and the upper side magnet 640 of the second speaker.

It can be seen that an average magnetic flux density B is increased by about 10% when the dynamic speaker and an F-PCM speaker sharing a magnetic field with the dynamic speaker are installed together, compared to a case in which only the dynamic speaker is installed as shown in FIG. 12. When the magnetic flux density increases, a magnetic force may increase and power of the speaker may be improved consequently.

As used herein, the terms "having," "containing," "including," "comprising," and the like are open-ended terms that indicate the presence of stated elements or features, but do not preclude additional elements or features. The articles "a," "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A two-way speaker, comprising:
- a frame having a space for accommodating parts;
- a yoke partitioning the space of the frame vertically and having a lower surface and a side wall;
- a first speaker unit disposed below the yoke and having a magnet, a top plate, a voice coil, and a diaphragm;
- a protector disposed below the first speaker unit and protecting the diaphragm;
- a second speaker unit disposed above the yoke and having a magnetic circuit and a flexible-printed coil membrane (F-PCM) diaphragm having a coil pattern formed on a polymer film; and
- a sound emission yoke attached to an upper surface of the second speaker unit.

2. The two-way speaker of claim 1, wherein the frame has a groove portion that forms a duct for guiding sound from the first speaker unit toward the sound emission yoke, on an inner circumferential surface of the side wall of the frame.

3. The two-way speaker of claim 2, wherein the sound emission yoke includes a first sound emission hole for emitting sound transferred from the first speaker unit and a second sound emission hole for emitting sound generated by the second speaker unit.

4. The two-way speaker of claim 1, wherein the frame has an atmospheric pressure equalization hole on a side of the frame to reduce a difference in atmospheric pressure between upper and lower sides of the diaphragm.

5. The two-way speaker of claim 1,
- wherein the magnetic circuit of the second speaker unit comprises: a lower magnet including a lower center magnet attached to a center of an upper surface of the yoke and a lower side magnet having a ring shape and disposed to be spaced apart from the lower center magnet; and an upper magnet including an upper center magnet attached to a center of a lower surface of the sound emission yoke and an upper side magnet having a ring shape and disposed to be spaced apart from the upper center magnet, and
- wherein the F-PCM diaphragm is located between the lower magnet and the upper magnet.

6. The two-way speaker of claim 5, wherein the magnet of the first speaker unit has a magnetization direction which is the same as magnetization directions of the lower side magnet and the upper center magnet of the second speaker unit, and has a magnetization direction opposite to magnetization directions of the lower center magnet and the upper side magnet.

* * * * *